(12) United States Patent
Finley et al.

(10) Patent No.: US 7,853,498 B2
(45) Date of Patent: Dec. 14, 2010

(54) METHOD, SYSTEM, AND COMPUTER PROGRAM PRODUCT FOR ON-DEMAND CREATION AND DISTRIBUTION OF CUSTOMIZED DYNAMIC CONTRACTS

(75) Inventors: Daniel J. Finley, Danbury, CT (US); Louis Guglielmo, Pelham Manor, NY (US); William M. Houston, Essex Junction, VT (US); Martina L. Kim, Hopewell Junction, NY (US); Randy B. Klipstein, Dobbs Ferry, NY (US); Joseph L. Simons, New Fairfield, CT (US); Christian Toft-Nielsen, New Canaan, CT (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/266,610

(22) Filed: Nov. 3, 2005

(65) Prior Publication Data

US 2007/0124234 A1    May 31, 2007

(51) Int. Cl.
    *G06F 40/00* (2006.01)
(52) U.S. Cl. ...................................... 705/35
(58) Field of Classification Search ............... 705/38
    See application file for complete search history.

(56) References Cited

U.S. PATENT DOCUMENTS

| | | | | |
|---|---|---|---|---|
| 5,414,621 A | * | 5/1995 | Hough | 705/10 |
| 5,523,942 A | * | 6/1996 | Tyler et al. | 705/4 |
| 5,963,925 A | * | 10/1999 | Kolling et al. | 705/40 |
| 6,067,531 A | * | 5/2000 | Hoyt et al. | 705/35 |
| 6,209,095 B1 | * | 3/2001 | Anderson et al. | 713/176 |
| 6,519,568 B1 | * | 2/2003 | Harvey et al. | 705/1 |
| 6,556,976 B1 | * | 4/2003 | Callen | 705/37 |
| 6,901,380 B1 | * | 5/2005 | Bremers | 705/27 |
| 7,020,632 B1 | * | 3/2006 | Kohls et al. | 705/37 |
| 7,062,472 B2 | * | 6/2006 | Dan et al. | 705/80 |
| 7,177,834 B1 | * | 2/2007 | Maestle | 705/38 |
| 7,181,427 B1 | * | 2/2007 | DeFrancesco et al. | 705/38 |

(Continued)

OTHER PUBLICATIONS

Contract Management Kluwer Bedijfswetenchappen, Netherlands, Nov. 2001, vol. 43, pp. 12-15 Simulation of Multiple Issue Two Party Negotiations using Negotiate—Hosui Wasfy, Industrial Engineering, pp. 152-157, 1997.*

(Continued)

*Primary Examiner*—Alexander Kalinowski
*Assistant Examiner*—Bruce I Ebersman
(74) *Attorney, Agent, or Firm*—William E. Schiesser; Hoffman Warnick LLC

(57) ABSTRACT

The present invention provides a method, system, and computer program product for the on-demand creation and distribution of customized dynamic contracts. At least one business opportunity is extracted from an opportunity database. For each extracted business opportunity, a credit score for a customer associated with the extracted business opportunity is obtained and a dynamically modifiable contract for the extracted business opportunity is generated. The dynamically modifiable contract is distributed to a contact associated with the extracted business opportunity, who presents the dynamically modifiable contract to the customer associated with the extracted business opportunity. The contact can modify the dynamically modifiable contract, if necessary, during negotiations with the customer, to provide a contract that is acceptable to the contact and the customer.

14 Claims, 2 Drawing Sheets

U.S. PATENT DOCUMENTS

| | | | |
|---|---|---|---|
| 7,551,780 B2* | 6/2009 | Nudd et al. | 382/190 |
| 2001/0029482 A1* | 10/2001 | Tealdi et al. | 705/38 |
| 2001/0034689 A1* | 10/2001 | Heilman, Jr. | 705/37 |
| 2002/0029194 A1* | 3/2002 | Lewis et al. | 705/39 |
| 2002/0042757 A1* | 4/2002 | Albazz et al. | 705/26 |
| 2002/0152155 A1* | 10/2002 | Greenwood et al. | 705/38 |
| 2002/0178103 A1* | 11/2002 | Dan et al. | 705/37 |
| 2003/0033240 A1* | 2/2003 | Balson et al. | 705/37 |
| 2003/0069837 A1* | 4/2003 | Mills et al. | 705/38 |
| 2004/0015433 A1* | 1/2004 | Johnson et al. | 705/37 |
| 2004/0143476 A1* | 7/2004 | Kapadia et al. | 705/9 |
| 2004/0143483 A1* | 7/2004 | Tivey et al. | 705/10 |
| 2004/0143484 A1* | 7/2004 | Kapadia et al. | 705/10 |
| 2004/0236660 A1* | 11/2004 | Thomas et al. | 705/37 |
| 2005/0102229 A1* | 5/2005 | Kemper et al. | 705/39 |
| 2005/0144033 A1* | 6/2005 | Vreeke et al. | 705/1 |
| 2005/0246294 A1* | 11/2005 | Farquharson et al. | 705/80 |
| 2006/0277123 A1* | 12/2006 | Kennedy et al. | 705/35 |
| 2006/0294002 A1* | 12/2006 | Brett | 705/38 |
| 2007/0016530 A1* | 1/2007 | Stasi et al. | 705/52 |
| 2007/0078789 A1* | 4/2007 | Griffit | 705/80 |
| 2007/0094296 A1* | 4/2007 | Peters, III | 707/102 |
| 2007/0156581 A1* | 7/2007 | Imrey et al. | 705/39 |
| 2007/0208638 A1* | 9/2007 | Brown | 705/35 |

OTHER PUBLICATIONS

Towards Formal Modeling of e-contacts Olivera Marjanovic and Zoran Milosevic, Schoof of information systems, Technology and Management, University of New South Wales, Sydney Australia, p. 59-68, IEEE Computer Society, 2001.*

Simulation of Multiple Issue Two Party Negotiations using Negotiate—Hosui Wasfy, Industrial Engineering, pp. 152-157, 1997.*

* cited by examiner

METHOD, SYSTEM, AND COMPUTER PROGRAM PRODUCT FOR ON-DEMAND CREATION AND DISTRIBUTION OF CUSTOMIZED DYNAMIC CONTRACTS

FIELD OF THE INVENTION

The present invention generally relates to electronic contracting systems, and more specifically relates to a method, system, and computer program product for the on-demand creation and distribution of customized dynamic contracts.

BACKGROUND OF THE INVENTION

There are financing companies, such as IBM Global Financing (IGF), that generate revenue by extending financing to customers who acquire hardware, software, and/or services. Some financing companies, for example, use a contract process flow that involves either working directly with a customer or through a business partner to:

1) Obtain information about the customer;

2) Obtain the customer's credit score;

3) Establish the appropriate finance rates, terms, and conditions for the contract;

4) Present the contract to the customer;

5) Negotiate with the customer, if necessary; and

6) Close the contract.

Due to the manual nature of this type of contract process, the end-to-end cycle time can be anywhere from several days to several months. This can have a significant negative impact on customer satisfaction as well as a finance company's ability to close deals.

Throughout this type of contract process, the employees of a financing company often work closely both on the customer front as well as on the backend to ensure successful execution of a contract. This typically results in significant overhead costs that must be offset by any profit generated from the contract. Due to this cost structure, and because profit is often small when dealing with smaller size customers, many financing companies will only involve themselves in high dollar volume deals, typically associated with larger size customers.

There is a need, therefore, for a contract process that has a shorter cycle time and reduced overhead.

SUMMARY OF THE INVENTION

In general, the present invention provides a method, system, and computer program product for the on-demand creation and distribution of customized dynamic contracts. The present invention overcomes the manually intensive processes of the prior art associated with generating a contract (e.g., a lease), thereby reducing overhead, and allows a financing company to react quickly, shortening the end-to-end cycle time for the contract. This allows a financing company the ability to capture financing opportunities from any size customer, especially from small and medium size businesses.

The present invention aggregates the workflows needed to generate a contract into a consolidated system for contract generation and distribution. This effectively automates the solution using a configurable set of criteria to allow mass creation of contracts on a scale that reduces overhead costs significantly (e.g., from thousands of dollars to only several dollars each), and that reduces the end-to-end cycle time significantly (e.g., less than 24 hours).

The present invention provides a dynamic contract in a modifiable format (e.g., a modifiable Portable Document Format (PDF)). This allows a contact (e.g., sales representative, business partner, etc.) of a financing company to modify the contract and negotiate with a customer with little or no direct involvement with the financing company, thereby reducing turn-around time and overhead.

A first aspect of the present invention is directed to a method for the on-demand creation and distribution of a dynamically modifiable contract, comprising: extracting a business opportunity from an opportunity database; obtaining a credit score for a customer associated with the extracted business opportunity; generating a dynamically modifiable contract for the extracted business opportunity; distributing the dynamically modifiable contract to a contact associated with the extracted business opportunity; presenting the dynamically modifiable contract to the customer associated with the extracted business opportunity; and modifying the dynamically modifiable contract, if necessary, to provide a contract that is acceptable to the contact and the customer.

A second aspect of the present invention is directed to a system for the on-demand creation and distribution of a dynamically modifiable contract, comprising: a contract generation engine for extracting a business opportunity from an opportunity database, for obtaining a credit score for a customer associated with the extracted business opportunity, and for generating a dynamically modifiable contract for the extracted business opportunity; and a contract distribution engine for distributing the dynamically modifiable contract to a contact associated with the extracted business opportunity; wherein the contact can present the dynamically modifiable contract to the customer and modify the dynamically modifiable contract, if necessary, to provide a contract that is acceptable to the contact and the customer.

A third aspect of the present invention is directed to a program product stored on a computer readable medium for the on-demand creation and distribution of a dynamically modifiable contract, the computer readable medium comprising program code for performing the following steps: extracting a business opportunity from an opportunity database; obtaining a credit score for a customer associated with the extracted business opportunity; generating a dynamically modifiable contract for the extracted business opportunity; distributing the dynamically modifiable contract to a contact associated with the extracted business opportunity; presenting the dynamically modifiable contract to the customer associated with the extracted business opportunity; and modifying the dynamically modifiable contract, if necessary, to provide a contract that is acceptable to the contact and the customer.

A fourth aspect of the present invention is directed to a method for deploying an application for the on-demand creation and distribution of a dynamically modifiable contract, comprising: providing a computer infrastructure being operable to: extract a business opportunity from an opportunity database; obtain a credit score for a customer associated with the extracted business opportunity; generate a dynamically modifiable contract for the extracted business opportunity; distribute the dynamically modifiable contract to a contact associated with the extracted business opportunity; present the dynamically modifiable contract to the customer associated with the extracted business opportunity; and modify the dynamically modifiable contract, if necessary, to provide a contract that is acceptable to the contact and the customer.

A fifth aspect of the present invention is directed to computer software embodied in a propagated signal for the on-demand creation and distribution of a dynamically modifiable contract, the computer software comprising instructions to cause a computer system to perform the following functions: extract a business opportunity from an opportunity database; obtain a credit score for a customer associated with the extracted business opportunity; generate a dynamically modifiable contract for the extracted business opportunity; distribute the dynamically modifiable contract to a contact associated with the extracted business opportunity; present the dynamically modifiable contract to the customer associated with the extracted business opportunity; and modify the dynamically modifiable contract, if necessary, to provide a contract that is acceptable to the contact and the customer.

BRIEF DESCRIPTION OF THE DRAWINGS

These and other features of this invention will be more readily understood from the following detailed description of the various aspects of the invention taken in conjunction with the accompanying drawings in which.

Figure 1:
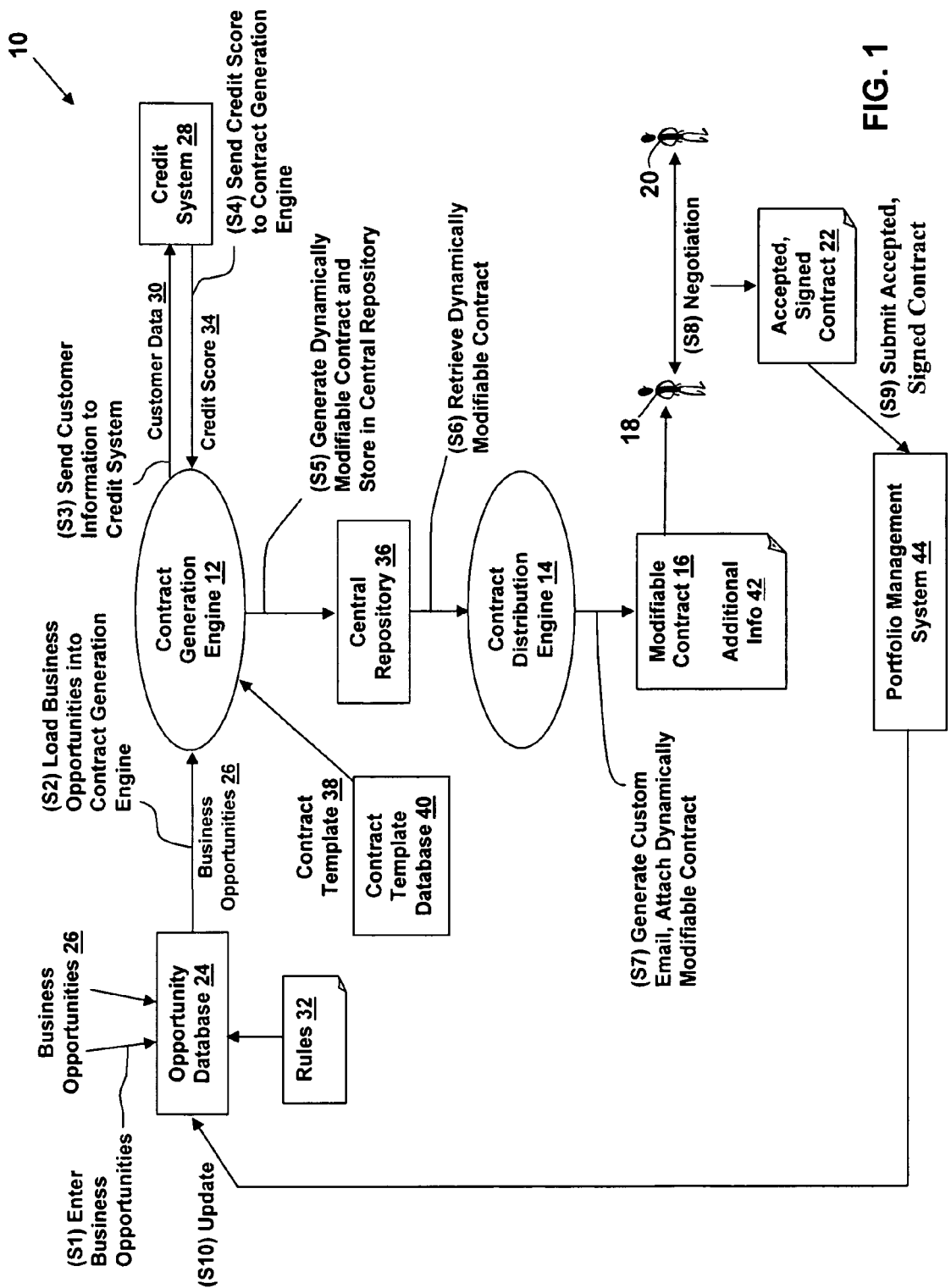
FIG. 1 depicts an illustrative system/flow diagram for the on-demand creation and distribution of customized dynamic contracts in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a method, system, and computer program product for the on-demand creation and distribution of customized dynamic contracts. The present invention overcomes the manually intensive processes of the prior art associated with generating a contract, thereby reducing overhead, and allows a financing company to react quickly, shortening the end-to-end cycle time for the contract. This allows a financing company the ability to capture financing opportunities from any size customer, especially from small and medium size businesses.

The present invention aggregates the workflows needed to generate a contract into a consolidated system for contract generation and distribution. This effectively automates the solution using a configurable set of criteria to allow mass creation of contracts on a scale that reduces overhead costs significantly (e.g., from thousands of dollars to only several dollars each), and that reduces the end-to-end cycle time significantly (e.g., less than 24 hours).

The present invention provides a dynamic contract in a modifiable format (e.g., a modifiable Portable Document Format (PDF)). This allows a contact (e.g., sales representative, business partner, etc.) of a financing company to modify the contract and negotiate with a customer with little or no direct involvement with the financing company, thereby reducing turn-around time and overhead.

An illustrative system/flow diagram 10 for the on-demand creation and distribution of customized dynamic contracts in accordance with an embodiment of the present invention is depicted in FIG. 1. In general, two engines, namely a contract generation engine 12 and a contract distribution engine 14, work in unison to create and distribute a dynamically modifiable contract 16 along with other relevant information to the appropriate contact 18 (e.g., sales representative, business partner, etc), who then negotiates directly with a customer 20 to obtain an accepted, signed contract 22. Also provided is an opportunity database 24 containing business opportunities 26 for the finance company, and a credit system 28 for obtaining credit information for a customer 20.

In step S1, one or more business opportunities 26 are loaded into the opportunity database 24. The business opportunities 26 can be entered by a contact 18 (e.g., after a meeting/telephone call with a customer 20 who has expressed interest in the purchase/lease of hardware, software, and/or services), directly by a customer 20 (e.g., via a web page), or in any other suitable manner. Each business opportunity 26 can include information comprising, for example, customer data 30 (e.g., customer name, address, etc.), product data (e.g., the number/type of hardware, software, and/or services to be purchased/leased), contact 18 information, etc.

In step S2, at least one business opportunity 26 is selectively extracted from the opportunity database 24 and loaded into the contract generation engine 12. Business opportunities 26 are selectively extracted from the opportunity database 24 based on a set of configurable rules 32 (e.g., set by the finance company). For example, the configurable rules 32 may be set up to extract from the opportunity database 24 all business opportunities 26 having a dollar value of less than $100,000, all business opportunities 26 associated with a particular company, or all business opportunities associated with a specific contact 18. Many other filtering conditions are also possible.

In step S3, the contract generation engine 12 sends the customer data 30 associated with each extracted business opportunity 26 to the credit system 28. In step S4, the credit system 28 determines and returns to the contract generation engine 12 a credit score 34 for each respective customer 20. The credit score 34 for a customer 20 is used to establish the parameters (e.g., pricing, finance rates, terms, and conditions) for a dynamically modifiable contract 16 associated with that customer 20.

In step S5, the contract generation engine 12 generates a dynamically modifiable contract 16 (certified by the finance company) for each extracted business opportunity 26 and stores the dynamically modifiable contracts 16 in a central repository 36. The details of each dynamically modifiable contract 16 are set in a manner known in the art based on the specifics of the associated business opportunity, the parameters established in step S4, etc. The dynamically modifiable contracts 16 can be generated by the contract generation engine 12 using contract templates 38 selected from a contract template database 40 or can be generated in any other suitable manner. The dynamically modifiable contract 16 is provided in a modifiable format such as Portable Document Format (PDF).

Additional information 42 for use by a contact 18 can be stored in conjunction with each dynamically modifiable contract 16 in the central repository. The additional information 42 can include, for example, credit conditions of the customer 20 and modifications acceptable to the finance company that can be made to the contract 16, if necessary, during negations with the customer 20. Other information that may be useful to a contact 18 during negotiation with a customer 20 can also be provided.

In step S6, the contract distribution engine 14 retrieves the dynamically modifiable contracts 16 generated in step S5 from the central repository 36. The additional information 42 associated with each of the dynamically modifiable contracts 16 is also retrieved, if available. In step S7, the contract generation engine 14 emails each dynamically modifiable contract 16 (and additional information 42, if available) to the appropriate contact 18. A contact 18, with a dynamically modifiable contract 16 in hand, can then negotiate in step S8 with a customer 20 to obtain an accepted signed contract 22. By using a modifiable format such as PDF, the contact 18 can edit the dynamically modifiable contract 16 as necessary (and within guidelines of the finance company) to rapidly close the deal with the customer 20 and provide an accepted, signed contract 22.

The contract generation engine 12 and the contract distribution engine 14 can be operated periodically (e.g., every 24 hours). To this extent, a contact 18 can expect to receive a dynamically modifiable contract 16 corresponding to a business opportunity 26 entered into the opportunity database 24 within a predetermined period of time (e.g., within 24 hours). This greatly shortens the end-to-end cycle time for the contract. The end-to-end cycle time can be shortened even further by operating the contract generation engine 12 and the contract distribution engine 14 more often (e.g., every 12 hours). Continuous operation of the contract generation engine 12 and the contract distribution engine 14 is also possible. In this case, the contract generation process can start as soon as a business opportunity 26 is entered into the opportunity database 24. Further, the dynamically modifiable contract 16 corresponding to the business opportunity 26 can be emailed to the appropriate contact 18 as soon as it is available from the contract generation engine 12.

In step S9, the accepted, signed contract 22 is submitted by the contact 18 to a portfolio management system 44, which sets up the contract 22 for billing. The opportunity database 24 is updated in step S10 to reflect the successful completion of the contract 22. This can be done by removing the corresponding business opportunity 26 from the opportunity database 24.

Figure 2:
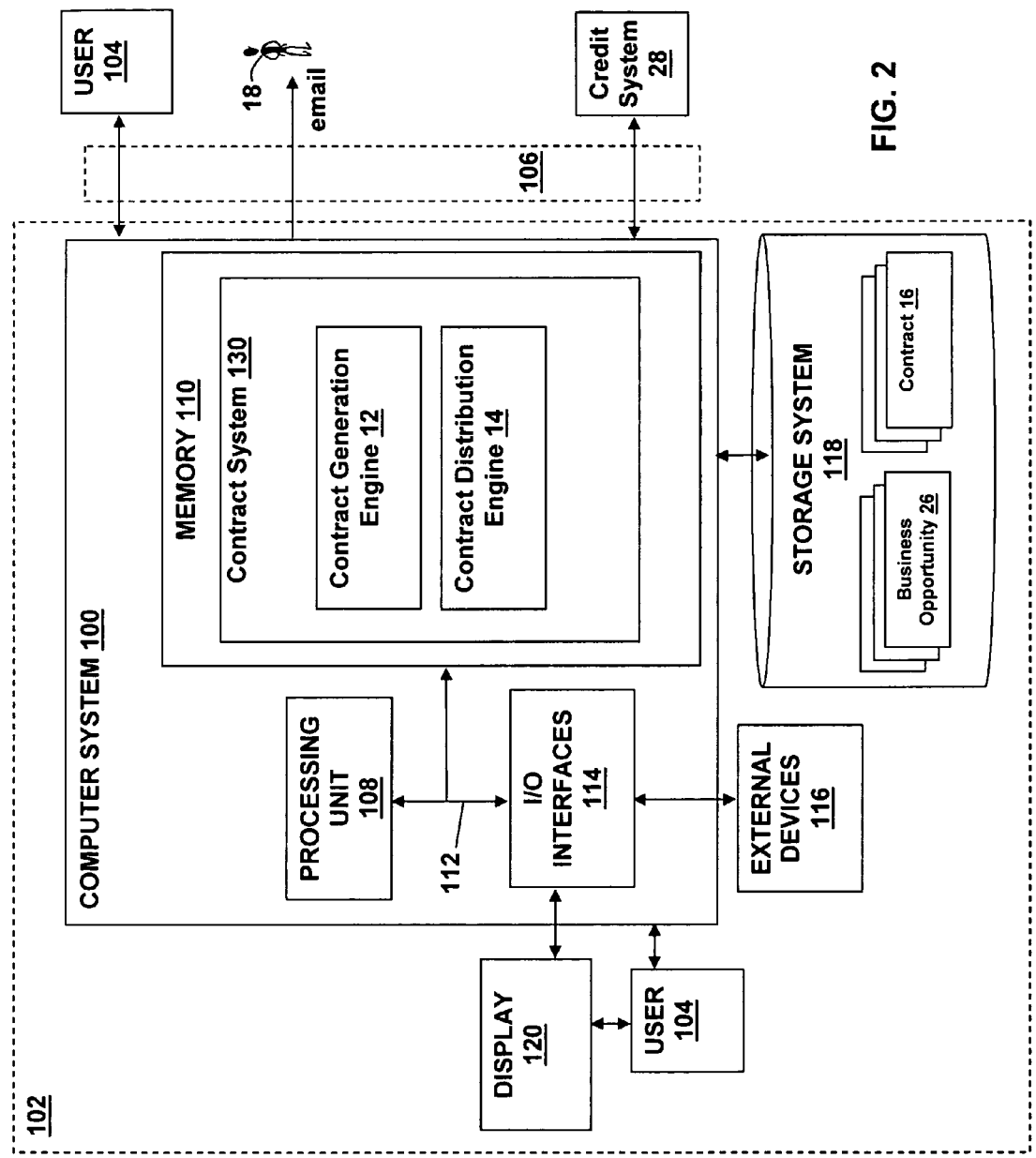
FIG. 2 depicts an illustrative computer system for implementing embodiment(s) of the present invention.

A computer system 100 for the on-demand creation and distribution of customized dynamic contracts in accordance with an embodiment of the present invention is depicted in FIG. 2. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that offers a service for the on-demand creation and distribution of customized dynamic contracts in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as contract system 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 2 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention, such as business opportunities 26, contract templates 38, dynamically modifiable contracts 16, etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a contract system 130 for the on-demand creation and distribution of customized dynamic contracts in accordance with the present invention. The contract system 130 includes a contract generation engine 12 and a contract distribution engine 14. The contract generation engine 12 is configured to extract selected business opportunities 26 from an opportunity database (e.g., provided by storage system 118), obtain credit information for customers 20 from a credit system 28, generate dynamically modifiable contracts 16, and store the dynamically modifiable contracts 16 in the storage system 118. The contract distribution system 14 is configured to retrieve dynamically modifiable contracts 16 from the storage system 118 and email the dynamically modifiable contracts 16 to the appropriate contacts 18, who then negotiate directly with customers 20 to finalize the contract 16.

The present invention can be offered as a business method on a subscription or fee basis. For example, one or more components of the present invention can be created, maintained, supported, and/or deployed by a service provider that offers the functions described herein for customers. That is, a service provider can be used to provide a service for the on-demand creation and distribution of customized dynamic contracts, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method performed on at least one computerized system for on-demand creation and distribution of a dynamically modifiable contract, the method comprising:
    loading, using the at least one computerized system, a business opportunity for a business entity into an opportunity database, wherein the business opportunity includes a business lead and a contact associated with the business entity, wherein the loading of the at least one business opportunity is performed by the contact during a meeting with a customer;
    selectively extracting in response to the loading, using the at least one computerized system, the business opportunity from the opportunity database in real time, the selectively extracting being based on a set of configurable rules including at least one of: extracting all business opportunities above a threshold dollar value, extracting all business opportunities associated with the customer, or extracting all business opportunities including the contact associated with the business entity;
    obtaining in response to the loading, using the at least one computerized system, a credit score for the customer associated with the extracted business opportunity;
    generating, using the at least one computerized system, a dynamically modifiable contract for the extracted business opportunity, wherein the dynamically modifiable contract is certified by a finance company, the dynamically modifiable contract including modifications to the dynamically modifiable contract that are acceptable to the business entity, the modifications acceptable to the business entity being based upon the credit score for the customer associated with the extracted business opportunity;
    distributing, using the at least one computerized system, the dynamically modifiable contract to the contact associated with the business entity and the extracted business opportunity;
    presenting, using the contact, the dynamically modifiable contract to the customer associated with the extracted business opportunity while withholding information about the acceptable modifications from the customer; and
    modifying by the contact, using the at least one computerized system, the dynamically modifiable contract in accordance with at least one of the acceptable modifications and a request from the customer to modify the dynamically modifiable contract, if necessary, to provide a contract that is acceptable to the business entity and the customer.

2. The method of claim 1, wherein the business lead comprises at least one of product data and contact information.

3. The method of claim 1, wherein obtaining the credit score for the customer further comprises:
    sending customer data to a credit system; and
    receiving the credit score from the credit system.

4. The method of claim 1, wherein generating a dynamically modifiable contract further comprises:
    generating the dynamically modifiable contract using a contract template.

5. The method of claim 1, wherein the dynamically modifiable contract is generated in a modifiable format.

6. The method of claim 1, wherein distributing the dynamically modifiable contract further comprises:
    emailing the dynamically modifiable contract to the contact in response to the generating.

7. The method of claim 1, wherein the loading of the business opportunity is performed by the customer using a web page connected to the at least one computerized system.

8. A computerized system for on-demand creation and distribution of a dynamically modifiable contract, comprising:
- at least one computer including:
- a system for loading a business opportunity for a business entity into an opportunity database, wherein the business opportunity includes a business lead and a contact associated with the business entity, wherein the loading of the at least one business opportunity is performed by the contact during a meeting with a customer;
- a contract generation engine for selectively extracting, in response to the loading, the business opportunity from the opportunity database in real time, for obtaining a credit score for the customer associated with the extracted business opportunity in response to the loading, and for generating a dynamically modifiable contract for the extracted business opportunity, wherein the dynamically modifiable contract is certified by a finance company, the dynamically modifiable contract including modifications to the dynamically modifiable contract that are acceptable to the business entity, the modifications acceptable to the business entity being based upon the credit score for the customer associated with the extracted business opportunity, wherein the selectively extracting is based on a set of configurable rules including at least one of: extracting all business opportunities above a threshold dollar value, extracting all business opportunities associated with the customer, or extracting all business opportunities including the contact associated with the business entity; and
- a contract distribution engine for distributing the dynamically modifiable contract to the contact associated with the business entity and the extracted business opportunity;
- wherein the contact can present the dynamically modifiable contract to the customer while withholding information about the acceptable modifications from the customer, and the contact can modify the dynamically modifiable contract in accordance with at least one of the acceptable modifications and a request from the customer to modify the dynamically modifiable contract, if necessary, to provide a contract that is acceptable to the business entity and the customer.

9. The system of claim 8, wherein the business lead comprises at least one of product data and contact information.

10. The system of claim 8, wherein the contract generation engine obtains the credit score for the customer by:
- sending customer data to a credit system; and
- receiving the credit score from the credit system.

11. The system of claim 8, wherein the contract generation engine is configured to generate the dynamically modifiable contract using a contract template.

12. The system of claim 8, wherein the contract generation engine is configured to generate the dynamically modifiable contract in a modifiable format.

13. The system of claim 8, wherein the contract distribution engine is configured to distribute the dynamically modifiable contract by emailing the dynamically modifiable contract to the contact in response to the generating.

14. A computer readable storage medium for on-demand creation and distribution of a dynamically modifiable contract, the computer readable storage medium comprising program code for performing the steps of:
- loading a business opportunity for a business entity into an opportunity database, wherein the business opportunity includes a business lead and a contact associated with the business entity, wherein the loading of the at least one business opportunity is performed by the contact during a meeting with a customer;
- selectively extracting, in response to the loading, the business opportunity from the opportunity database in real time, the selectively extracting being based on a set of configurable rules including at least one of: extracting all business opportunities above a threshold dollar value, extracting all business opportunities associated with the customer, or extracting all business opportunities including the contact associated with the business entity;
- obtaining, in response to the loading, a credit score for the customer associated with the extracted business opportunity;
- generating a dynamically modifiable contract for the extracted business opportunity, wherein the dynamically modifiable contract is certified by a finance company, the dynamically modifiable contract including modifications to the dynamically modifiable contract that are acceptable to the business entity, the modifications acceptable to the business entity being based upon the credit score for the customer associated with the extracted business entity;
- distributing the dynamically modifiable contract to the contact associated with the business entity and the extracted business opportunity;
- presenting, using the contact, the dynamically modifiable contract to the customer associated with the extracted business opportunity while withholding information about the acceptable modifications from the customer; and
- modifying, by the contact, the dynamically modifiable contract in accordance with at least one of the acceptable modifications and a request from the customer to modify the dynamically modifiable contract, if necessary, to provide a contract that is acceptable to the business entity and the customer.

* * * * *